US008685283B2

(12) United States Patent
Wei et al.

(10) Patent No.: US 8,685,283 B2
(45) Date of Patent: Apr. 1, 2014

(54) SUPERFICIALLY POROUS METAL OXIDE PARTICLES, METHODS FOR MAKING THEM, AND SEPARATION DEVICES USING THEM

(75) Inventors: Ta-Chen Wei, Newark, DE (US); Wu Chen, Newark, DE (US); William E. Barber, Landenberg, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1258 days.

(21) Appl. No.: 12/201,796

(22) Filed: Aug. 29, 2008

(65) Prior Publication Data

US 2010/0051877 A1    Mar. 4, 2010

(51) Int. Cl.
*G01N 33/00* (2006.01)
*C01B 33/26* (2006.01)

(52) U.S. Cl.
USPC ........ 252/408.1; 423/335; 423/610; 423/608; 423/628; 423/118.1; 428/402.24

(58) Field of Classification Search
USPC ............. 521/154, 155; 428/4.4, 315.5, 316.6, 428/328, 329, 331, 403, 405, 402–402.24; 423/610, 608, 628; 251/408.1
See application file for complete search history.

(56) References Cited

U.S. PATENT DOCUMENTS

| | | | |
|---|---|---|---|
| 3,485,658 A | 12/1969 | Iler | |
| 3,505,785 A | 4/1970 | Kirkland | |
| 3,634,558 A | 1/1972 | Stober | |
| 3,634,588 A | 1/1972 | Steitz | |
| 4,017,528 A | 4/1977 | Unger et al. | |
| 4,477,492 A | 10/1984 | Bergna et al. | |
| 4,775,520 A | 10/1988 | Unger et al. | |
| 4,983,369 A | 1/1991 | Barder et al. | |
| 5,057,296 A | 10/1991 | Beck | |
| 5,098,684 A | 3/1992 | Kresge et al. | |
| 6,528,167 B2 | 3/2003 | O'Gara | |
| 6,686,035 B2 | 2/2004 | Jiang et al. | |
| 7,223,473 B2 | 5/2007 | Jiang et al. | |
| 7,563,367 B2 | 7/2009 | Rustamov et al. | |
| 2007/0187313 A1 | 8/2007 | Ekeroth | |
| 2007/0189944 A1* | 8/2007 | Kirkland et al. | ............ 423/118.1 |
| 2008/0269368 A1* | 10/2008 | Wyndham et al. | ............ 521/154 |

(Continued)

FOREIGN PATENT DOCUMENTS

| | | |
|---|---|---|
| EP | 2008971 A1 | 12/2008 |
| WO | WO 2006/019988 A1 | 2/2006 |
| WO | WO 2006/039507 A2 | 4/2006 |

OTHER PUBLICATIONS

Yoshina-Ishii et al.; Periodic mesoporous organosilicas, PMOs: fusion of organic and inorganic chemistry 'inside' the channel walls of hexagonal mesoporous silica; 1999; Chem. Commun., 1999, 2539-2540; United Kingdom.

(Continued)

*Primary Examiner* — James J Seidleck
*Assistant Examiner* — S. Camilla Pourbohloul
(74) *Attorney, Agent, or Firm* — Milstein Zhang & Wu LLC

(57) ABSTRACT

Micelle-templated superficially porous particles having a solid core and an outer porous shell with ordered pore structures and a narrow particle size distribution, such as about ±5% (one sigma), and a high specific surface area of about 5 to about 1000 m²/g.

20 Claims, 3 Drawing Sheets

Scanning electron micrograph of the starting materials (on the left) and end product of Example 5 (on the right)

(56) References Cited

U.S. PATENT DOCUMENTS

| | | |
|---|---|---|
| 2009/0053524 A1 | 2/2009 | Yamada et al. |
| 2009/0311533 A1 | 12/2009 | Chen et al. |
| 2010/0213131 A1 | 8/2010 | Linford et al. |

OTHER PUBLICATIONS

Gritti et al.; Comparative study of the performance of columns packed with several new fine silica particles Would the external roughness of the particles affect column properties?; Journal of Chromatography A, 1166 (2007) 30-46; United States.

Corma et al.; Synthesis of MCM-41 with Different Pore Diameters without Addition of Auxiliary Organics; Chem. Mater, 1997, 9. 2123-2126; United States.

Inagaki; Novel Mesoporous Materials with a Uniform Distribution of Organic Groups and Inorganic Oxide in Their Frameworks; J. Am. Chem. Soc. 1999, 121, 9611-9614; United States.

Kirkland; Superficially porous silica microspheres for fast high-performance liquid chromatography of macromolecules; Journal of Chromatography A, 890 (2000) 3-13; United States.

Kapoor; Synthesis of Phenylene Bridged Mesoporous Silsequioxanes with Spherical Morphology in Ammonia Solution; The Chemical Society of Japan, Chemistry Letters vol. 33, No. 2 (2004); Japan.

Dong-Jun Kim; Morphology Control of Organic-Inorganic Hybrid Mesoporous Silica by Microwave Heating; The Chemical Society of Japan, Chemistry Letters Vo. 33, No. 4 (2004); Japan.

Kimura; Synthesis of mesoporous aluminophosphates using surfactants with long alkyl chain lengths and triisopropylbenzene as a solubilizing agent; Chem. Commun., 1998; United Kingdom.

Lefevre; Synthesis of Large-Pore Mesostructured Micelle-Templated Silicas as Discrete Spheres; Chem Mater. 2005, 17, 601-607; United States.

Martin; Morphological Control of MCM-41 by Pseudomorphic Synthesis; Angew. Chem. Int. Ed. 2002, 41, No. 14; Germany.

Melde; Mesoporous Sieves with Unived Hybrid Inorganic/Organic Frameworks; Chem. Mater. 1999, 11. 3302-3308; United States.

Rebbin; Synthesis and characterisation of spherical periodic mesoporous organosilicas (sph-PMOs) with variable pore diameters; Microporous and Mesoporous Materials 72 (2004) 99-104; United States.

Ulagappan; Evidence for supramolecular organization of alkane and surfactant molecules in the process of forming mesoporous silica; Chem. Commun., 1996; United States.

Sayari; New Approaches to Pore Size Engineering of Mesoporous Silicates; Adv. Mater. 1998, 10, No. 16; Germany.

Kresge; Ordered mesoporous molecular sieves synthesized by a liquid-crystal template mechanism; Nature vol. 359; United States.

* cited by examiner

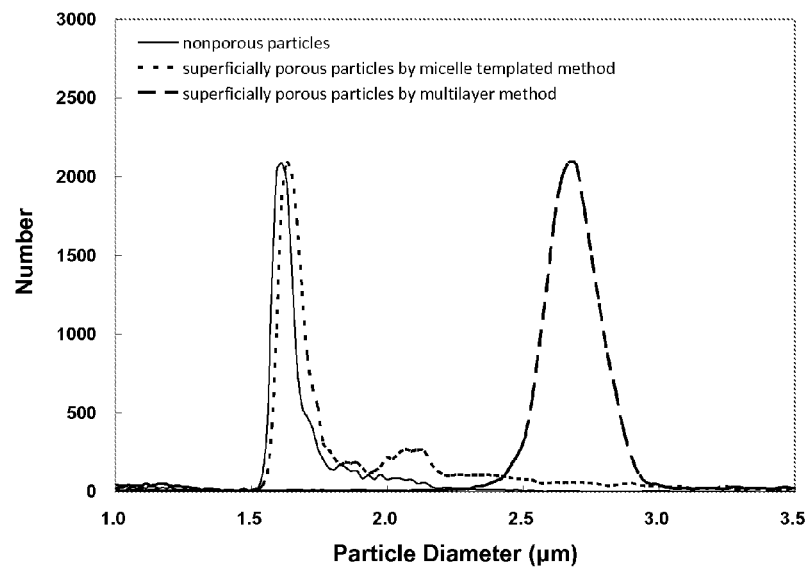
Figure 1. Particle size distribution of nonporous silica particles and superficially porous particles made by micelle-templated method (Example 6) as well as the multilayer method.
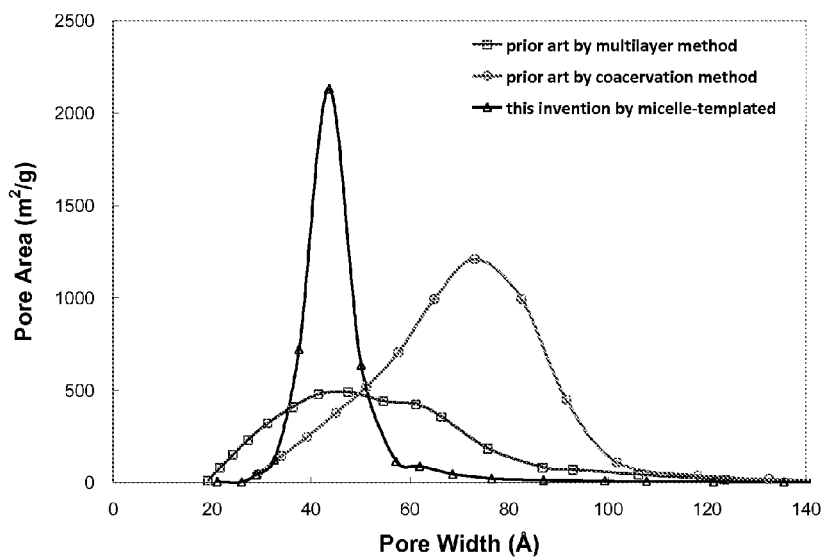
Figure 2. Pore size distribution of superficially particles made by multilayer, coacervation and micelle-templated method of Example 5.

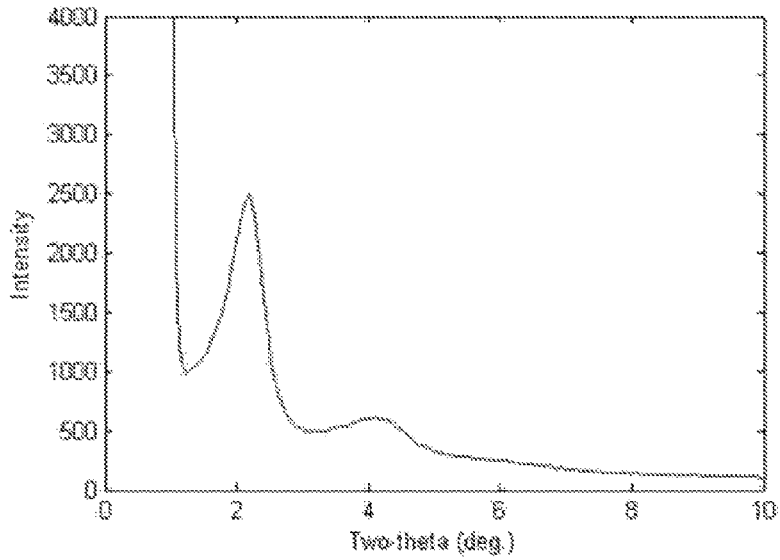
Figure 3. Small angle powder x-ray diffraction pattern of the product of Example 1. The diffraction pattern indicates that pores are in an ordered hexagonal arrangement with a distance of 47 Å between pores.
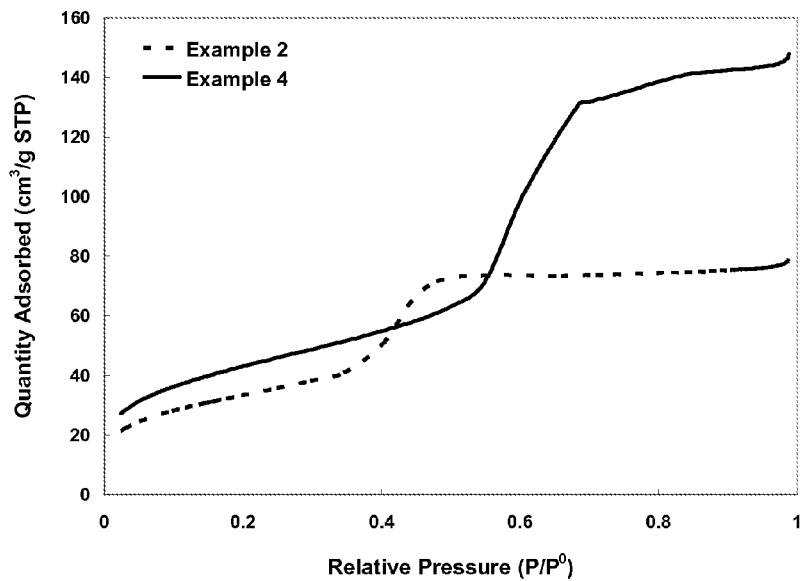
Figure 4. $N_2$ adsorption isotherm of the products of Examples 2 and 4

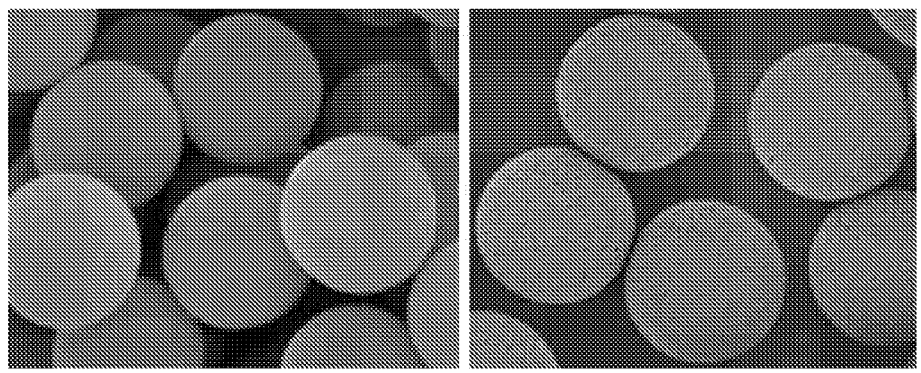
Figure 5. Scanning electron micrograph of the starting materials (on the left) and end product of Example 5 (on the right)

SUPERFICIALLY POROUS METAL OXIDE PARTICLES, METHODS FOR MAKING THEM, AND SEPARATION DEVICES USING THEM

FIELD OF THE INVENTION

This invention relates to superficially porous metal oxide particles and to methods for making them, as well as to separation devices containing superficially porous particles.

BACKGROUND OF THE INVENTION

Superficially porous metal oxides, particularly silica particles are used in chromatography columns to separate mixed substances from one another, as well as in other applications. Such particles consist of a nonporous core with an outer porous shell. High pressure liquid chromatography ("HPLC") columns containing superficially porous silica particles have short mass transfer distances, resulting in fast mass transfer; and thus fast separation.

U.S. Patent Publication No. 2007/0189944 describes three conventional methods to prepare superficially porous silica particles. The first is spray-drying where solid silica particles or cores are mixed with a silica sol, and the mixture is sprayed under high pressure through a nozzle into a drying tower at high temperature (e.g., 200° C.). Unfortunately, the particles made this way often are incompletely or un-homogeneously coated. Such particles invariably also contain significant concentrations of unwanted totally porous particles of similar size, which come from the sol. Elutriation-fractionation of this product often fails to remove the totally porous contaminating particles, making the spray-drying approach less than optimal for producing the desired particles. In addition, the spray drying method can only make particle sizes larger than 5 μm, most in 30-100 μm range, and such particles have broad particle size distributions.

A second conventional method is "multilayer technology," in which solid silica cores are repeatedly coated with layers of colloidal particles by alternating layers of oppositely charged nanoparticles and polymers containing amino-functional groups until the particles reach the desired sizes. Such methods are described in U.S. Pat. No. 3,505,785 and U.S. Patent Publication No. 2007/0189944. Even at its best, the process is labor intensive, and very difficult to practice. When such a method is applied on small cores with size less than 2 μm, the final particle surface tends to become less spherical and rougher. The process generates a lot of different types of aggregated particles, resulting in loss of yield of the desired particles.

A third conventional method involves coacervation. In this method, solid silica spheres are suspended in a coacervation reaction mixture including urea, formaldehyde, and colloidal silica sol under acidic conditions. A coacervate of urea-formaldehyde polymer and ultra-pure silica sol is thus formed and becomes coated on the solid spheres (see, e.g., Kirkland, Journal of Chromatography A, 890 (2000) 3-13). The urea-formaldehyde polymer is then removed by burning at 540° C., and the particles are then strengthened by sintering at an elevated temperature. This procedure is much simpler and more practical compared to the multilayer technology described above. However, the coacervation method has its drawbacks. One is that some of the solid particles often are not coated, leaving non porous particles in the finished product. Another is that much smaller totally porous particles are formed along with the coated and uncoated particles. This latter drawback necessitates further classification of totally porous particles and superficially porous particles.

Thus, conventional methods of preparing superficially porous silica particles all use silica nanoparticles as the building blocks on which an outer porous shell is added. As a result, the porous shell has randomly distributed pores with wide pore size distribution. Moreover, the resulting rough external particle surfaces limit the performance of columns containing such particles, at high flow rates by generating an unusually high film mass transfer resistance. Rough surfaces also limit the packing density because of increased friction forces among particles during the packing process (Gritti, et al., J. Chromatogr. A, 1166 (2007) 30-46).

Micelle-templated silica synthesis of totally porous silica particles through pseudomorphic transformation has been reported (see e.g. Martin, Angew. Chem. Int. Ed., 41 (2002) 2590). In contrast with the earlier techniques where pores are randomly distributed, micelle-templated synthesis produces a more ordered pore framework involving preformed micellar structures via a liquid crystal templating mechanism (see, Kresge, Nature, 359, 710 and U.S. Pat. No. 5,057,296).

Pseudomorphism is a term used by mineralogists to describe phase transformation that does not change the shape of a material. Thus the pseudomorphic synthesis mentioned here, assisted by a surfactant, for totally porous pre-shaped silica particles reportedly forms a highly ordered narrow mesopore size distribution, high surface area and pore volume without changing the initial shape of silica particles. The high specific surface area, high pore volume, and adjustable pore size should improve the retention capacity and molecular selectivity as well as provide an overall improvement in mass transfer between the stationary and mobile phase.

Lefevre reportedly synthesized 10 μm totally porous silica particles with pore diameters ranging from 7 to 9 nm, specific surface areas of 900 m$^2$/g, and pore volumes of 1.5 ml/g (see, "Synthesis of Large-Pore Mesostructured Micelle-Templated Silicas as Discrete Spheres," Chem. Mater., 2005, 17, 601-607). The synthesis started using totally porous silica particles as a starting material in a sealed autoclave in a basic solution at above the boiling point of water from several hours to days where the solution contained a micelle agent such as cetyltrimethylammonium bromide, and a swelling agent such as trimethyl benzene. After the reaction, the micelle and swelling agents were removed by burning them off. However, they reported that large pore, totally porous silica particles with a particle size smaller than 8 μm cannot be made by this method due to particle aggregation. They also reported that particle explosion can occur if the pore volume of the totally porous silica starting material is too low. Thus, they start with totally porous particles (pore volume larger than 0.7 cm$^3$/g) and produce totally porous particles with a more ordered pore structure and higher surface area than the starting material.

Hybrid (i.e., covalent bonding between the organic and inorganic components within the material) totally porous silica particles have become popular as a HPLC packing material for HPLC columns because of their stability at high pH as well as their high physical strength. One method to prepare hybrid totally porous silica particles uses emulsion polymerization of an organic siloxane polymer precursor in the emulsion droplets in the presence of PEG or toluene as a porogen, in which the siloxane polymer precursor is substituted with organic moieties. PEG or toluene is later washed out, eliminating the need of any high temperature burn-off. Examples of such particles are disclosed in U.S. Pat. Nos. 4,017,528, 6,686,035, and 7,223,473, and in WO2006039507.

Thus, there is a need to make both hybrid and non-hybrid superficially porous silica particles with a narrow particle size distribution, narrow pore size distribution, high specific surface area and a porous outer layer for faster separation, lower chromatography column pressure drop, and higher efficiency, together with stability at high pH and with good mechanical strength under chromatography conditions.

SUMMARY OF THE INVENTION

One aspect of this invention is a method for making superficially porous particles, comprising subjecting substantially solid metal oxide particles selected from silica, alumina, zirconia, or titania, in an aqueous solution to agitation for a time and a pH sufficient to pseudomorphically transform said particles, in the presence of one or more surfactants.

Preferably, the process of this invention further comprises refluxing the particles and surfactant in the presence of a swelling agent.

Another aspect of this invention is superficially porous particles, comprising:
(a) solid cores having a size ranging from about 20% to about 99% of the size of the entire particles;
(b) substantially porous outer shells having ordered pores with a median pore size range from about 15 to about 1000 Å with a pore size distribution (one standard deviation) of no more than 50% of the median pore size.
(c) wherein the particles have a specific surface area of from about 5 to about 1000 $m^2/g$;
(d) wherein the particles have a median size range from about 0.5 μm to about 100 μm with a particle size distribution (one standard deviation) of no more than 15% of the median particle size;
(e) wherein the particles comprise a metal oxide selected from silica, alumina, titania or zirconia.

Preferably, the superficially porous particles of this invention comprise an organically modified hybrid of one or more of said metal oxides.

A further aspect of this invention includes separation devices that employ superficially porous particles of this invention.

The process and product of this invention are quite different from prior efforts. The superficially porous particles of this invention made from pseudomorphic synthesis of this invention keep generally the same size and morphology as the starting solid metal oxide particles, while other methods coat a porous layer onto the solid cores, in which the final superficially porous particle size and particle size distribution increase. Because we can make substantially monodispersed solid particles for the starting metal oxide material, the resulting superficially porous metal oxide particles made by the process of this invention results in a superficially porous metal oxide particle product that remains substantially monodispersed (as shown in FIG. 5). Because the pores are formed by micelle-templating, the superficially porous particles in this invention have a narrow pore size distribution (as shown in FIG. 2) and ordered pore structure (as shown in FIG. 3). Moreover, the starting solid particles can turn into hybrid superficially porous particles by adding the organic metal alkoxide during the process (as shown in Example 7). All of these characteristics represent good properties for chromatographic packing materials, among other things.

BRIEF DESCRIPTION OF THE DRAWINGS

FIG. 1 is a chart of particle size distribution of nonporous silica particles and superficially porous particles made by micelle-templated method (Example 7 below) as well as multilayer method.

FIG. 2 is a chart of pore size distribution of superficially particles made by multilayer, coacervation and micelle-templated (Example 5 below) methods.

FIG. 3 is a small angle powder x-ray diffraction pattern of the product of Example 1.

FIG. 4 is an isotherm plot of nitrogen adsorption measurements from Examples 2 and 4.

FIG. 5 is a scanning electron micrograph of the solid cores and the product of Example 5.

DETAILED DESCRIPTION OF THE PREFERRED EMBODIMENTS

This invention is a process for making superficially porous metal oxide particles as well as novel superficially porous metal oxide particles with narrow particle size distribution and ordered pore structures.

The starting material used to make the novel metal oxide particles of this invention with the inventive process is monodispersed solid metal oxide particles that can be made by known processes (see, e.g., U.S. Pat. Nos. 3,634,588, 4,775,520, 4,983,369) or by sintering porous particles at temperatures as high as 1100° C. to the proper size to form solid particles. By "solid particles" we mean those having a very low pore volume (i.e., ≤0.005 $cm^3/g$). Such solid particle starting materials can be pure or substantially pure metal oxide particles, or they can be organically modified hybrids of one or more of said metal oxides. For example, if the metal oxide is silica, hybrid silica refers to a material having the formula $SiO_2/(R^1_pR^2_qSiO_t)_n$ or $SiO_2/[R^3(R^1_rSiO_t)_m]_n$; wherein $R^1$ and $R^2$ are independently a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^3$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100

In the process of this invention, we partially dissolve such metal oxide particles at a pH and for a time and temperature under agitation in the presence of a surfactant so as to produce superficially porous particles having a relatively monodispersed particle size and a relatively narrow pore size distribution. Preferably, the substantially solid metal oxide particles have a median particle size from about 0.5 μm to about 100 μm and a particle size distribution of no more than 15% of the median size, more preferably, a particle size distribution of no more than 10% of the median size, and most preferably a distribution of no more than 5% of the median size.

It is well known that metal oxides of silica, alumina, zirconia and titania can be dissolved in either strong basic or acidic solution, depending on the metal oxide. For example, silica can be dissolved in a high pH solution such as sodium hydroxide or ammonia solution, and in a hydrofluoric acid solution. In the process of this invention, we only partially dissolve such monodisperse solid metal oxide particles. As such, the pH range can be broader for partial dissolution as compared to complete dissolution. For example, in the case of alumina solid particles, acidic pH can be used for dissolution of alumina (and negatively charged surfactants or non-ionic surfactants can be used to form pores). Where the solid particles comprise silica, the solution can contain fluoride ion such as hydrofluoric acid or ammonium fluoride for partial dissolution. For example, silica can be partially dissolved in the presence of hydrofluoric acid at a concentration from 50 ppm to 5000 ppm. When such an acid is used, the concentration of hydrofluoric acid is preferably 200 to 800 ppm. Alternatively, the solid silica particles can be partially dissolved where the pH of the solution is basic from about 10 to about 13.5, more preferably from about 12 to about 13.5 The base used to achieve such basic pH is preferably one such as ammonium hydroxide.

As far as a sufficient temperature for the process of this invention, the solution is either under reflux or in an autoclave at a temperature higher than about 50° C. from one hour to seven days, preferably under reflux. By "under reflux" we are referring to the technique where the solution, optionally under stirring, inside a reaction vessel is connected to a condenser, such that vapors given off by the reaction mixture are cooled back to liquid, and sent back to the reaction vessel. The vessel can then be heated at the necessary temperature for the course of the reaction. The purpose is to accelerate the reaction thermally by conducting it at an elevated temperature (i.e. the boiling point of the aqueous solution). The advantage of this technique is that it can be left for a long period of time without the need to add more solvent or fear of the reaction vessel boiling dry as the vapor is condensed in the condenser. In addition, as a given solvent will always boil at a certain temperature, one can be sure that the reaction will proceed at a fairly constant temperature within a narrow range. In this invention, we prefer to reflux the mixtures described above for less than about 7 days, preferably at least one hour, more preferably from about 2 to about 72 hours at a temperature of from about 75 to about 110° C., more preferably from about 85 to about 100° C.

By "agitation," we mean sufficient movement of the solution containing the particles so that the particles do not agglomerate. Agitation can be done by stirring, sparging, ultrasonicating, shaking and the like. Stirring the mixture is preferred.

As mentioned previously, the processes of this invention utilize a surfactant. One or more ionic surfactants or non-ionic surfactants are preferred. More preferably, the surfactant is selected from one or more of the group of polyoxyethylene sorbitans, polyoxythylene ethers, block copolymers, alkyltrimethylammonium, alkyl phosphates, alkyl sulfates, alkyl sulfonates, sulfosuccinates, carboxylic acid, surfactants comprising an octylphenol polymerized with ethylene oxide, and combinations thereof. Most preferably the surfactant(s) is selected from one or more of a compound of the formula $C_nH_{2n+1}(CH_3)_3NX$ where X is selected from chlorine and bromine, and n is an integer from 10 to 20. Preferred surfactants include trimethyloctadecylammonium bromide and hexadecyltrimethylammonium bromide.

Preferably, this invention provides a method for making superficially porous silica particles by subjecting substantially monodisperse solid silica particles to a basic aqueous solution under reflux with a cationic surfactant. In the present invention, we prepared superficially porous silica particles using micelle-templated pseudomorphic synthesis. In one embodiment, we treated solid silica cores in a basic solution containing surfactants that form micelles, and swelling agents, under reflux condition from at least one hour to seven days. The outer layer of the solid cores is dissolved and re-precipitates to form a porous layer during a pseudomorphic transformation. By "pseudomorphic transformation" or "pseudomorphically transform," we mean process conditions that allow the metal oxide particles in question to be dissolved on their surfaces as the solid oxide surface is being replaced with a superficially porous shell at the same time such that the final superficially porous particles keep the same general size as the original solid particles, and thus retain the substantially monodispersed characteristic of the original starting material solid particles after pseudomorphic synthesis. Preferably, the superficially porous particles have solid cores having a size ranging from about 50% to about 90% of the size of the entire particles, most preferably from about 60% to about 80% of the size of the entire particles.

In the process of this invention, preferably an organic metal alkoxide molecule is added to the solution so as to form an organically modified hybrid metal oxide in the superficial pores on the particles. Preferably, the organic metal alkoxide is selected from one or more of the formulae I-IV:

(I)

(II)

(III)

(IV)

wherein for formulae I-IV: R is selected independently in each instance from methyl and ethyl, $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more M atoms; and M is selected from Si, Ti and Zr.

When M is Si in Formulae I-IV, the organic metal alkoxide is preferably selected from one or more of methyltriethoxysilane, ethyltriethoxysilane, 1,2-bis(triethoxysilyl)methane, 1,2-bis(triethoxysilyl)ethane and 1,2-bis(triethoxysilyl)benzene.

Where M in formulae I-IV is Al, the organic metal alkoxide is selected from one or more of the formulae IX and X:

(IX)

(X)

wherein R is selected independently in each instance from methyl and ethyl, $R^1$ is selected from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more Al atoms.

The process preferably employs a swelling agent that can dissolve into the surfactant micelles. The swelling agent causes the micelles to swell, increasing (adjusting) the size of the pores to the desired size. Preferably, the mixture of the pH adjuster (the base or acid), solid silica (or other metal oxide) particles and surfactant is heated for a time (e.g., 20 minutes to 1.5 hours) at a temperature of from 30 to 60° C. before the swelling agent is added. The mixture containing the swelling agent is heated from 15 min to one month (but preferably less than about 7 days) at a temperature of from about 75 to about 110° C. Whereupon the mixture is preferably refluxed as described above.

Preferred swelling agents include but are not limited to an alkyl substituted benzene, a dialkylamine, a trialkylamine, a tertraalkyl ammonium salt, an alkane of the formula $(C_nH_{2n-2})$ where n is an integer of 5-20 (ref: Ulagappan, N., Chem. Commun., 1996), a cycloalkane of the formula ($C_nH_{2n}$) where n is an integer of 5-20, a substituted alkane of the formula ($X—C_nH_{2n+1}$) where n is an integer of 5-20 and X is chloro, bromo, or —OH, or a substituted cycloalkane of the formula ($X—C_nH_{2n-1}$) where n is an integer of 5-20 and X is chloro, bromo, or —OH. More preferred swelling agents include trimethylbenzene (ref: Beck, J. S. U.S. Pat. No. 5,057,296); triisopropylbenzene (ref: Kimura, T.; Sugahara, Y.; Kuroda, K. J. Chem. Soc., Chem. Commun. 1998, 559); N,N-dimethylhexadecylamine, N,N-dimethyldecylamine, trioctylamine and tridodecylamine (Ref: Sayari, A.; Kruk, M.; Jaroniec, M.; Moudrakovski, I. L. Adv. Mater. 1998, 10, 1376); cyclohexane, cyclohexanol, dodecanol, chlorododecane and tetramethylammonium and tetraethylammonium sodium salts (Ref: Corma, A.; Kan, K.; Navarro, M. T.; Pérez-Pariente, J.; Rey, F. Chem. Mater. 1997, 9, 2123).

The solid particles, the surfactant and the optional swelling agent are subjected to elevated temperature in the aqueous solution, preferably under reflux. The micelles formed in the solution cause the metal oxide dissolved from the partially dissolved metal oxide particles to re-deposit onto the partially dissolved particles due to the attraction of the dissolved metal oxide to the micelles. After the treatment, for example reflux, is complete, the particles are separated from the solution (e.g., by centrifugation, filtration and the like), and the particles are subjected to a treatment (e.g., with elevated temperature) to drive off (e.g., combust or volatilize) the surfactant and swelling agent from the particles. If the optional organosilane is bound (e.g., covalently) to the particles, the particles are subjected to a solvent extraction treatment (e.g., agitating in ethanol/HCl with elevated temperature) to wash off the surfactant and swelling agent from the particles so that the organosilane still remains bound after such treatment.

As mentioned previously, this invention further includes the superficially porous particles themselves described above. In addition to the above, the particles preferably have solid cores having a size ranging from about 50% to about 90% of the size of the entire particles, more preferably from about 60% to about 80% of the size of the entire particles. Preferably the superficially porous particles of this invention have a particle size distribution (one standard deviation) of 10% or less of the median particle size, more preferably of 5% or less of the median particle size. Further, the superficially porous particles of this invention have a pore size distribution (one standard deviation) which is no more than 40% of the pore size median, more preferably no more than 30% of the pore size median.

Preferably, the superficially porous particles of this invention have a median size from about 0.5 μm to about 10 μm, more preferably from about 1.0 μm to about 5 μm. Preferably, the superficially porous particles of this invention have a pore size range from about 60 Å to about 800 Å, more preferably from about 70 Å to about 300 Å.

Preferably, the superficially porous particles of this invention have a specific surface area of the particles that is from about 5 m²/g to about 300 m²/g.

Preferably, the superficially porous particles comprise an organic metal oxide having a composition selected from formulae XI and XII:

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

More preferably, in formulae XI and XII, M is Si and in that case $R^1$ and $R^2$ are preferably independently methyl, or ethyl, $R^3$ is methylene, ethylene or 1,2-benzylene.

However, in formulae XI and XII M can be Ti or Zr.

The superficially porous particles can also comprise an organic metal oxide having a composition selected from one or both of the formulae XIII and XIV:

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more metal atoms; m is an integer greater than or equal to 2; and n is a number from 0.01 to 100.

Yet another aspect of this invention includes superficially porous particles, comprising an organic metal oxide having a composition selected from one or more of formulae XVI-XIX:

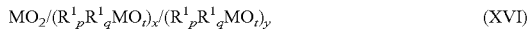

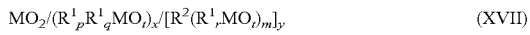

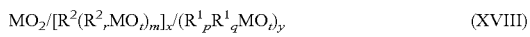

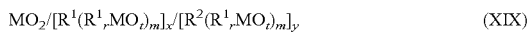

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and x and y each is independently a number from 0.01 to 100; and M is selected from Si, Ti, or Zr; with a median pore size range from about 15 to about 1000 Å; a specific surface area of from about 5 to about 1000 m²/g; and a median size range from about 0.5 μm to about 100 μm.

To make superficially porous particles of formulae XVI-XIX from the starting materials of formulae XI and XII, the solid hybrid starting materials of Formulae XI and XII are pseudomorphically transformed in accordance with the method of this invention in the presence of one or more organic metal alkoxides of Formulae I-IV in the process. The resulting product is superficially totally porous particles, comprising an organic metal oxide having a composition selected from one or more of Formulae XVI-XIX where the particles have:

(a) a median pore size range from about 15 to about 1000 Å;
(b) a specific surface area of from about 5 to about 1000 m²/g; and
(c) a median size range from about 0.5 μm to about 100 μm Yet another aspect of this invention includes superficially porous particles, comprising an organic metal oxide having a composition selected from one or more of formulae XX-XXIII:

$$Al_2O_3/(R^1AlO)_x/(R^1AlO)_y \quad (XX)$$

$$Al_2O_3/[R^2(AlO)_m]_x/(R^1AlO)_y \quad (XXI)$$

$$Al_2O_3/(R^1AlO)_x/[R^2(AlO)_m]_y \quad (XXII)$$

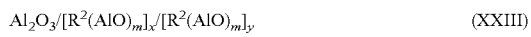

$$Al_2O_3/[R^2(AlO)_m]_x/[R^2(AlO)_m]_y \quad (XXIII)$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more Al atoms; m is an integer greater than or equal to 2; and x and y each is independently a number from 0.01 to 100; with a median pore size range from about 15 to about 1000 Å; a specific surface area of from about 5 to about 1000 m²/g; and a median size range from about 0.5 μm to about 100 μm.

To produce superficially porous particles of Formulae XX-XXIII, one can start with substantially solid hybrid solid particles of the Formulae XXIV and XXV:

$$Al_2O_3/(R^1AlO)_n \quad (XXIV)$$

$$Al_2O_3/[R^2(AlO)_m]_n \quad (XXV)$$

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100.

To make the superficially porous particles of formulae XX-XXIII from the solid hybrid particle starting material of formulae XXIV and XXV, the solid hybrid starting materials of Formulae XXIV and XXV are pseudomorphically transformed in accordance with the method of this invention in the presence of one or more organic metal alkoxides of Formulae XXVI and XXVII

$$(RO)_2Al—R^3—Al(OR)_2 \quad (XXVI)$$

$$(RO)_2Al—R^1 \quad (XXVII)$$

wherein R is selected independently in each instance from methyl and ethyl, $R^1$ is selected from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^3$ is selected from a substituted or unsubstituted $C_1$ to $C_7$ alkylene, alkenylene, alkynylene, or arylene group bridging two or more Al atoms.

The alkoxides of Formulae XXVI and XXVII are either commercially available or can be made as taught in standard organometallic synthetic methods.

The resulting product from the reaction is superficially porous particles, comprising an organic metal oxide having a composition selected from one or more of Formulae XX-XXIII with a median pore size range from about 15 to about 1000 Å; a specific surface area of from about 5 to about 1000 m²/g; and a median size range from about 0.5 μm to about 100 μm.

The superficially porous particles of this invention can also be surface modified with a surface modifier having the formula $Z_a(R')_bSi—R$, where Z is selected from Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

The micelle-templated superficially porous particles exhibit at least one X-ray diffraction peak between 0.01° and 10° of the 2θ scan range (due to the ordered pore structure) as shown in FIG. 3. X-ray diffraction is a well known characterization technique in the art (R. Jenkins, R. L. Snyder, Introduction to X-ray Powder Diffractometry, John Wiley & Sons, Inc., New York, 1996). The ordered pore structures may be further characterized by symmetry or space groups that are observed from X-ray diffraction, including but not limited to hexagonal, cubic, triclinic, monoclinic, orthorhombic, tetragonal, trigonal and lamellar.

Small angle powder x-ray diffraction patterns of the superficially porous particles were recorded on a PANalytical's X'Pert diffractometer (Dupont Analytical Solutions, Delaware), equipped with a Cu-Kα radiation source. The results of SAXS on the particles made according to Example 1 below are shown in FIG. 3

Scanning electron microscopy measurements were conducted on a JEOL 640 (Micron Inc., Delaware), and an example is provided in FIG. 5 for the particles made according to Example 5 below The specific surface areas and pore sizes of the superficially porous particles made according to examples below were measured by using nitrogen Brunauer Emmett Teller (BET) isotherm on a Micromeritics analyzer.

The pore size distributions of the particles made according to examples below were calculated on the Barrett Joyner Halanda (BJH) model from a 30-point BET surface area plot.

Particle sizes were determined with a Coulter Multisizer (Beckman-Coulter, USA). For particle size distribution, the standard deviation (sigma) was calculated by dividing the FWHM (full width at half maximum) of the peak by 2.3548.

Carbon loading analysis was done by a Perkin Elmer 2400 elemental analyzer.

We provide the following examples of the product and process of this invention. These examples are not intended to limit the invention.

Example 1

Solid silica particles were synthesized based on U.S. Pat. No. 4,775,520. The median particle size is 2.08 μm with a distribution of 3% (one sigma). 20.8 g of the solid particles were slurried in 1593 ml deionized water in a flat bottom flask. 230 ml of 30 wt % ammonium hydroxide and 13 g of hexadecyltrimethylammonium bromide were added. The mixture was refluxed for 24 hours, and then allowed to cool to room temperature. The solution was filtered, washed with water, ethanol and acetone, and dried in a vacuum oven at 100° C. for at least 2 hours. Then the silica particles were calcined at 550° C. for 8 hours at a heating rate of 1° C. per minute. The nitrogen surface area of these particles was 384 $m^2/g$ and the median pore size was 2.7 nm as measured by the Tristar 3000 analyzer (Micromeritics). The final particle size is 2.16 μm with a distribution of 3% (one sigma)

Example 2

Solid silica particles were synthesized based on U.S. Pat. No. 4,775,520. The median particle size is 2.08 μm with a distribution of 3% (one sigma). 3.0 g of the solid particles were slurried in 200 ml deionized water in a flat bottom flask. 25 ml of 30 wt % ammonium hydroxide and 1.45 g of hexadecyltrimethylammonium bromide were added. The mixture was heated at 50° C. for 40 minutes under stirring. 0.6 g of decane was added to the previous solution and stirred for another one hour. Then the solution was refluxed for 20 hours, and then allowed to cool to room temperature. The solution was filtered, washed with water, ethanol and acetone, and dried in a vacuum oven at 100° C. for at least 2 hours. Then the silica particles were calcined at 550° C. for 8 hours at a heating rate of 1° C. per minute.

The nitrogen surface area of these particles was 119 $m^2/g$ and the median pore size was 4.0 nm as measured by the Tristar 3000 analyzer (Micromeritics). The final particle size is 2.16 μm with a distribution of 3% (one sigma)

Example 3

Solid silica particles were synthesized based on U.S. Pat. No. 4,775,520. The median particle size is 2.08 μm with a distribution of 3% (one sigma). 3.0 g of the solid particles were slurried in 200 ml deionized water in a flat bottom flask. 25 ml of 30 wt % ammonia hydroxide and 1.45 g of hexadecyltrimethylammonium bromide were added. The mixture was heated at 50° C. for 40 minutes under stirring. 1.2 g of decane was added to the previous solution and stirred for another one hour. Then the solution was refluxed for 20 hours, and then allowed to cool to room temperature. The solution was filtered, washed with water, ethanol and acetone, and dried in a vacuum oven at 100° C. for at least 2 hours. Then the silica particles were calcined at 550° C. for 8 hours at a heating rate of 1° C. per minute.

The nitrogen surface area of these particles was 125 $m^2/g$ and the median pore size was 5.0 nm with a distribution of 14% (one sigma) as measured by the Tristar 3000 analyzer (Micromeritics). The final particles size is 2.22 μm with a distribution of 3% (one sigma)

Example 4

Solid silica particles were synthesized based on U.S. Pat. No. 4,775,520. The median particle size is 2.08 μm with a distribution of 3% (one sigma). 3.0 g of the solid particles were slurried in 200 ml deionized water in a flat bottom flask. 25 ml of 30 wt % ammonium hydroxide and 1.45 g of hexadecyltrimethylammonium bromide were added. The mixture was heated at 50° C. for 40 minutes under stirring. 1.8 g of decane was added to the previous solution and stirred for another one hour. Then the solution was refluxed for 20 hours, and then allowed to cool to room temperature. The solution was filtered, washed with water, ethanol and acetone, and dried in a vacuum oven at 100° C. for at least 2 hours. Then the silica particles were calcined at 550° C. for 8 hours at a heating rate of 1° C. per minute.

The nitrogen surface area of these particles was 152 $m^2/g$ and the median pore size was 5.9 nm with a distribution of 11% (one sigma) as measured by the Tristar 3000 analyzer (Micromeritics). The final particle size is 2.28 μm with a distribution of 3% (one sigma)

Example 5

Solid silica particles were synthesized based on U.S. Pat. No. 4,775,520. The median particle size is 1.92 μm with a distribution of 3% (one sigma). 3.0 g of the solid particles were slurried in 200 ml deionized water in a flat bottom flask. 25 ml of 30 wt % ammonia hydroxide and 1.5 g of trimethyloctadecylammonium bromide were added. The mixture was heated at 50° C. for 40 minutes under stirring. 2.2 g of tridecane was added to the previous solution and stirred for another one hour. Then the solution was refluxed for 20 hours, and then allowed to cool to room temperature. The solution was filtered, washed with water, ethanol and acetone, and dried in a vacuum oven at 100° C. for at least 2 hours. Then the silica particles were calcined at 550° C. for 8 hours at a heating rate of 1° C. per minute. The elemental analysis (carbon loading) was measured by the Perkin Elmer 2400 analyzer (Micro-Analysis, Inc). The measured carbon loading is 0.05% which indicates the surfactants were removed.

The nitrogen surface area of these particles was 200 $m^2/g$ and the median pore size was 7.4 nm with a distribution of 9% (one sigma) as measured by the Tristar 3000 analyzer (Micromeritics). The final particles size is 2.0 μm with a distribution of 3% (one sigma)

Example 6

Solid silica particles were synthesized based on U.S. Pat. No. 4,775,520. The median particle size is 1.60 μm with a distribution of 3% (one sigma). 3.2 g of the solid particles were slurried in 245 ml deionized water in a flat bottom flask. 35 ml of 30 wt % ammonium hydroxide, 1.7 g of hexadecyltrimethylammonium bromide and 12.6 g of trimethylbenzene were added. The mixture was then refluxed for 20 hours, and then allowed to cool to room temperature. The solution was filtered, washed with water, ethanol and acetone, and dried in a vacuum oven at 100° C. for at least 2 hours. Then the silica particles were calcined at 550° C. for 8 hours at a heating rate of 1° C. per minute. The nitrogen surface area of these particles was 75 $m^2/g$ and the median pore size was 8.9 nm with a distribution of 30% (one sigma) as measured by the Tristar 3000 analyzer (Micromeritics). The final particle size is 1.63 μm with a distribution of 3% (one sigma)

Example 7

Solid silica particles were synthesized based on U.S. Pat. No. 4,775,520. The median particle size is 2.08 μm with a distribution of 3% (one sigma). 3.0 g of solid silica particles were slurried in 200 ml deionized water in a flat bottom flask. 25 ml of 30 wt % ammonium hydroxide and 1.45 g of trimethyloctadecylammonium bromide were added. The mixture was heated at 50° C. for 40 minutes under stirring. 2.2 g of tridecane was added to the previous solution and stirred for another one hour. 3.0 g of bis(triethoxysilyl)ethane was added and then the solution was refluxed for 20 hours, and then allowed to cool to room temperature. The solution was filtered, washed with water, ethanol and acetone, and dried in a vacuum oven at 100° C. for at least 2 hours. Then the silica particles were reslurried in 450 ml of ethanol and 10.5 g of 37 wt % hydrogen chloride at 50° C. for 6 hours. The elemental analysis (carbon loading) was measured by the Perkin Elmer 2400 analyzer (Micro-Analysis, Inc). The measured carbon loading is 3.47% which indicates the organic hydrocarbon is incorporated into the silica framework.

The nitrogen surface area of these particles was 80 m$^2$/g and the median pore size was 7.2 nm as measured by the Tristar 3000 analyzer (Micromeritics). The final particle size is 2.13 µm with a distribution of 3% (one sigma).

Example 8

3.0 g of solid alumina particles of median diameter 2.0 µm are slurried in 200 ml deionized water in a flat bottom flask. 0.1 wt % hydrochloric acid, and 1.45 g of hexadecyltrimethylammonium bromide are added. The mixture is heated at 50° C. for 40 minutes under stirring. Then the solution is refluxed for 20 hours, and then allowed to cool to room temperature. The solution is filtered, washed with water, ethanol and acetone, and dried in a vacuum oven at 100° C. for at least 2 hours. Then the silica particles are calcined at 550° C. for 8 hours at a heating rate of 1° C. per minute.

The superficially porous particles of this invention can be used in separation devices. A separation device of this invention has a stationary phase comprising superficially porous particles, comprising:

(a) solid cores having a size ranging from about 20% to about 99% of the size of the entire particles;

(b) substantially porous outer shells wherein the median pore size ranges from about 15 to about 1000 Å;

(c) wherein the particles have a specific surface area of from about 5 to about 1000 m$^2$/g;

(d) wherein the particles have a median size range from about 0.5 µm to about 100 µm; and (e) wherein the particles comprise a metal oxide, selected from silica, alumina, zirconia, or titania.

The separation device of this invention can have particles that have been surface modified with a surface modifier having the formula Z$_a$(R')$_b$Si—R as described above, preferably where R is selected from alkyl, alkenyl, alkynyl, aryl, diol, amino-, alcohol, amide, cyano, ether, nitro, carbonyl, epoxide, sulfonyl, cation exchanger, anion exchanger, carbamate and urea. When R is alkyl, preferably it is selected from a C$_1$-C$_{30}$ alkyl group. Preferably, the separation device employs superficially porous particles wherein the surface modifier is selected from octyltrichlorosilane, octadecyltrichlorosilane, octyldimethylchlorosilane, and octadecyldimethylchlorosilane, most preferably octyldimethylchlorosilane and octadecyldimethylchlorosilane.

Examples of the separation devices of this invention include chromatographic columns, chips, solid phase extraction media, pipette tips and disks.

We claim:
1. Superficially porous particles, comprising:
   solid cores having a size ranging from about 20% to about 99% of the size of the entire particles;
   substantially porous outer shells having ordered pores with a median pore size ranges from about 15 to about 1000 Å with a pore size distribution (one standard deviation) of no more than 30% of the median pore size, wherein the ordered pores produce at least one X-ray diffraction peak between 0.01° and 10° of the 2θ scan range;
   wherein the particles have a specific surface area of from about 5 to about 1000 m$^2$/g;
   wherein the particles have a median size range from about 0.5 µm to about 100 µm with a particle size distribution (one standard deviation) of no more than 15% of the median particle size;
   wherein the particles comprise a metal oxide selected from silica, alumina, titania or zirconia.

2. The superficially porous particles of claim 1 wherein the particles comprise an organically modified hybrid of one or more of said metal oxides.

3. The superficially porous particles of claim 1 wherein the particles have solid cores having a size ranging from about 50% to about 90% of the size of the entire particles.

4. The superficially porous particles of claim 3 wherein the particles have solid cores having a size ranging from about 60% to about 80% of the size of the entire particles.

5. The superficially porous particles of claim 1 wherein the median size of the particles is from about 0.5 µm to about 10 µm.

6. The superficially porous particles of claim 1 wherein the pore size ranges from about 60 Å to about 800 Å.

7. The superficially porous particles of claim 1 wherein the specific surface area of the particles is from about 5 m$^2$/g to about 300 m$^2$/g.

8. The superficially porous particles of claim 1 further comprising an organic metal oxide having a composition selected from:

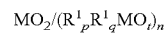

and

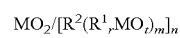

wherein R$^1$ is independently selected in each instance from a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is a substituted or unsubstituted C$_1$ to C$_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

9. The superficially porous particles of claim 8 wherein M is Si.

10. The superficially porous particles of claim 9 wherein R$^1$ and R$^2$ are independently methyl, or ethyl, R$^3$ is methylene, ethylene or 1,2-benzylene.

11. The superficially porous particles of claim 8 wherein M is Ti.

12. The superficially porous particles of claim 8 wherein M is Zr.

13. The superficially porous particles of claim 1 further comprising an organic metal oxide having a composition selected from:

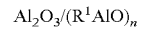

and

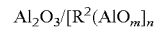

wherein R$^1$ is a substituted or unsubstituted C$_1$ to C$_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, R$^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more metal atoms; m is an integer greater than or equal to 2; and n is a number from 0.01 to 100.

14. The superficially porous particles of claim 1 that have been surface modified with a surface modifier having the formula $Z_a(R')_b Si—R$, where Z is selected from Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

15. The superficially porous particles of claim 1 exhibit at least one X-ray diffraction peak between 0.01° and 10° of the 2θ scan range.

16. The superficially porous particles of claim 1 wherein the particle size distribution (one standard deviation) is 10% or less of the median particle size.

17. The superficially porous particles of claim 1 wherein the pore size distribution (one standard deviation) is no more than 40% of the pore size median.

18. Superficially porous particles, comprising an organic metal oxide having a composition selected from one or more of formulae XVI-XIX:

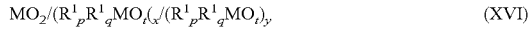  (XVI)

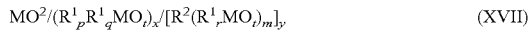  (XVII)

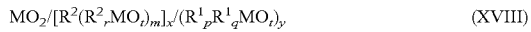  (XVIII)

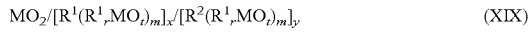  (XIX)

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and x and y each is independently a number from 0.01 to 100; and M is selected from Si, Ti, or Zr; with a median pore size range from about 15 to about 1000 Å with an ordered structure and a pore size distribution (one standard deviation) of no more than 30% of the median pore size, wherein the ordered pores produce at least one X-ray diffraction peak between 0.01° and 10° of the 2θ scan range; a specific surface area of from about 5 to about 1000 $m^2/g$; and a median size range from about 0.5 μm to about 100 μm.

19. A separation device having a stationary phase comprising superficially porous particles, comprising:
solid cores having a size ranging from about 20% to about 99% of the size of the entire particles;
substantially porous outer shells wherein the median pore size ranges from about 15 to about 1000 Å with an ordered structure and a pore size distribution (one standard deviation) of no more than 30% of the median pore size, wherein the ordered pores produce at least one X-ray diffraction peak between 0.01° and 10° of the 2θ scan range;
wherein the particles have a specific surface area of from about 5 to about 1000 $m^2/g$;
wherein the particles have a median size range from about 0.5 μm to about 100 μm; and
wherein the particles comprise a metal oxide, selected from silica, alumina, zirconia, or titania.

20. The separation device of claim 19 wherein the particles have been surface modified with a surface modifier having the formula $Z_a(R')_b Si—R$, where Z=Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is selected from alkyl, alkenyl, alkynyl, aryl, diol, amino-, alcohol, amide, cyano, ether, nitro, carbonyl, epoxide, sulfonyl, cation exchanger, anion exchanger, carbamate and urea.

* * * * *

UNITED STATES PATENT AND TRADEMARK OFFICE
CERTIFICATE OF CORRECTION

PATENT NO. : 8,685,283 B2
APPLICATION NO. : 12/201796
DATED : April 1, 2014
INVENTOR(S) : Ta-Chen Wei et al.

It is certified that error appears in the above-identified patent and that said Letters Patent is hereby corrected as shown below:

In the Claims:

In column 15, line 19, in claim 15, delete "20" and insert -- $2\theta$ --, therefor.

Signed and Sealed this
Seventeenth Day of June, 2014

Michelle K. Lee
*Deputy Director of the United States Patent and Trademark Office*